UNITED STATES PATENT OFFICE.

E. KNABESCHUCH, OF NEW YORK, N. Y.

IMPROVEMENT IN COLORING AND POLISHING WOOD.

Specification forming part of Letters Patent No. 51,462, dated December 12, 1865.

*To all whom it may concern:*

Be it known that I, EDWARD KNABESCHUCH, of the city, county, and State of New York, have invented a new and useful Improvement in Coloring and Polishing Wood; and I do hereby declare that the following is a full, clear, and exact description thereof, which will enable others skilled in the art to fully understand and make use of the same.

The present invention relates to a novel mode of applying colors to wood, the object being to produce at the same time a fine finish, polish, and enamel thereon, greatly resembling in appearance the ordinary china, porcelain, or japanned wares.

In coloring and polishing woods under the present improvements, I first fill its pores or grain by rubbing over such of its surfaces as are to be colored and polished a solution of alcohol and shellac, a sufficient quantity of shellac being used to accomplish the same, which shellac at the same time imparts a smooth and even polish to the wood, as in ordinary wood-polishing. I then take any of the ordinary "aniline" colors, so called, according to the color which it is desired the wood should have, and having dissolved it in alcohol or other suitable spirits, the quantity of alcohol or spirits thus used being either more or less in proportion to the coloring material, according to the consistency or strength of the color desired, I apply it to the wood previously polished by shellac and alcohol, as explained, and, thoroughly rubbing the same thereon, produce a fine and beautiful coloring, polishing, and enameling, as it were, thereof, having the appearance of china, porcelain, and japanned wares, as so called.

Previous to the application of the alcohol and shellac to the wood, as explained, the wood may be stained with logwood or any other of the well-known dies now in common use, or it may be colored in the manner described in a previous application for Letters Patent made by me for coloring and polishing woods, which application is now on file in the United States Patent Office, in which case it is not necessary to apply the shellac and alcohol, the aniline colors being then rubbed directly thereon, as above explained, producing substantially a similar polish and finish. The kind of aniline color used, of course, depends upon the color to be produced upon the wood, and may consist of a combination of two or more different colors or only one, as is obvious.

Having thus described my invention, I claim as new and desire to secure by Letters Patent—

Coloring and polishing wood with aniline colors, substantially in the manner described.

The above specification of my invention signed by me this 10th day of November, 1865.

EDW. KNABESCHUCH.

Witnesses:
ALBERT W. BROWN,
M. M. LIVINGSTON.